(12) United States Patent
Cutler (10) Patent No.: US 7,602,412 B2
(45) Date of Patent: Oct. 13, 2009

(54) TEMPERATURE COMPENSATION IN MULTI-CAMERA PHOTOGRAPHIC DEVICES

(75) Inventor: Ross G. Cutler, Duval, WA (US)

(73) Assignee: Microsoft Corporation, Redmond, WA (US)

(*) Notice: Subject to any disclaimer, the term of this patent is extended or adjusted under 35 U.S.C. 154(b) by 947 days.

(21) Appl. No.: 11/027,187

(22) Filed: Dec. 30, 2004

(65) Prior Publication Data

US 2005/0117034 A1 Jun. 2, 2005

Related U.S. Application Data

(63) Continuation-in-part of application No. 10/177,315, filed on Jun. 21, 2002, now Pat. No. 7,259,784, and a continuation-in-part of application No. 10/608,363, filed on Jun. 26, 2003, now Pat. No. 7,298,392.

(51) Int. Cl.
*H04N 7/00* (2006.01)
*G02B 17/00* (2006.01)

(52) U.S. Cl. ....................................... 348/36
(58) Field of Classification Search .................... 348/36
See application file for complete search history.

(56) References Cited

U.S. PATENT DOCUMENTS

| | | | |
|---|---|---|---|
| 3,118,340 A | 1/1964 | Iwerks | |
| 5,313,308 A * | 5/1994 | Hasegawa et al. | 358/406 |
| 5,539,483 A | 7/1996 | Nalwa | |
| 5,745,305 A | 4/1998 | Nalwa | |
| 5,793,527 A | 8/1998 | Nalwa | |
| 5,990,934 A | 11/1999 | Nalwa | |
| 6,005,611 A | 12/1999 | Gullichsen et al. | |
| 6,111,702 A | 8/2000 | Nalwa | |
| 6,115,176 A | 9/2000 | Nalwa | |
| 6,128,143 A | 10/2000 | Nalwa | |
| 6,141,145 A | 10/2000 | Nalwa | |
| 6,144,501 A | 11/2000 | Nalwa | |
| 6,195,204 B1 | 2/2001 | Nalwa | |
| 6,219,090 B1 | 4/2001 | Nalwa | |
| 6,285,365 B1 | 9/2001 | Nalwa | |
| 6,313,865 B1 | 11/2001 | Driscoll, Jr. et al. | |
| 6,341,044 B1 | 1/2002 | Driscoll, Jr. et al. | |
| 6,346,967 B1 | 2/2002 | Gullichsen et al. | |

(Continued)

FOREIGN PATENT DOCUMENTS

JP 1996125835 A 5/1996

(Continued)

OTHER PUBLICATIONS

European Patent Office European Search Report, for European Patent Application No. 05 111 765.3, Apr. 4, 2006, Munich.

(Continued)

*Primary Examiner*—Nhon T Diep (57) ABSTRACT

A temperature measuring device measures ambient temperature in which a multi-camera photographic device is operated. A remapping function that maps individual images into a panoramic space is varied according to the measured temperature. The cameras and remapping tables are calibrated at various temperatures. When the ambient temperature is measured, values from a nearest matching remapping table are used, or new values are interpolated/extrapolated from one or more nearest matching tables. The remapping function is thus calibrated to properly remap the individual images into the panoramic image.

17 Claims, 5 Drawing Sheets

U.S. PATENT DOCUMENTS

| | | | |
|---|---|---|---|
| 6,356,296 B1 | 3/2002 | Driscoll, Jr. et al. | |
| 6,356,397 B1 | 3/2002 | Nalwa | |
| 6,373,642 B1 | 4/2002 | Wallerstein et al. | |
| 6,388,820 B1 | 5/2002 | Wallerstein et al. | |
| 6,392,687 B1 | 5/2002 | Driscoll, Jr. et al. | |
| 6,424,377 B1 | 7/2002 | Driscoll, Jr. et al. | |
| 6,426,774 B1 | 7/2002 | Driscoll, Jr. et al. | |
| 6,459,451 B2 | 10/2002 | Driscoll, Jr. et al. | |
| 6,472,665 B1 * | 10/2002 | Ishisaka et al. | 250/368 |
| 6,480,229 B1 | 11/2002 | Driscoll, Jr. et al. | |
| 6,493,032 B1 | 12/2002 | Wallerstein et al. | |
| 6,515,696 B1 | 2/2003 | Driscoll, Jr. et al. | |
| 6,583,815 B1 | 6/2003 | Driscoll, Jr. et al. | |
| 6,593,969 B1 | 7/2003 | Driscoll, Jr. et al. | |
| 6,677,981 B1 * | 1/2004 | Mancuso et al. | 348/36 |
| 6,700,711 B2 | 3/2004 | Nalwa | |
| 6,741,250 B1 | 5/2004 | Furlan et al. | |
| 6,756,990 B2 | 6/2004 | Koller | |
| 6,795,106 B1 | 9/2004 | Cooper | |
| 6,885,509 B2 | 4/2005 | Wallerstein et al. | |
| 6,924,832 B1 | 8/2005 | Shiffer et al. | |
| 6,974,973 B2 * | 12/2005 | Rossi et al. | 257/72 |
| 7,015,954 B1 * | 3/2006 | Foote et al. | 348/218.1 |
| 7,099,510 B2 | 8/2006 | Jones et al. | |
| 7,382,383 B2 * | 6/2008 | Shiomi et al. | 345/690 |
| 2002/0034020 A1 | 3/2002 | Wallerstein et al. | |
| 2002/0041324 A1 | 4/2002 | Satoda | |
| 2002/0063802 A1 | 5/2002 | Gullichsen et al. | |
| 2002/0094132 A1 | 7/2002 | Hoffman et al. | |
| 2002/0154417 A1 | 10/2002 | Wallerstein et al. | |
| 2003/0193606 A1 | 10/2003 | Driscoll, Jr. et al. | |
| 2003/0193607 A1 | 10/2003 | Driscoll, Jr. et al. | |
| 2003/0220971 A1 | 11/2003 | Kressin | |
| 2004/0008407 A1 | 1/2004 | Wallerstein et al. | |
| 2004/0021764 A1 | 2/2004 | Driscoll, Jr. et al. | |
| 2004/0254982 A1 | 12/2004 | Hoffman et al. | |
| 2005/0046703 A1 | 3/2005 | Cutler | |
| 2005/0151837 A1 | 7/2005 | Cutler | |
| 2005/0285943 A1 | 12/2005 | Cutler | |

FOREIGN PATENT DOCUMENTS

| | | |
|---|---|---|
| WO | WO 98/47291 | 10/1998 |
| WO | WO 00/11512 | 3/2000 |
| WO | WO 2004/004320 A1 | 1/2004 |
| WO | WO 2004/111689 | 12/2004 |
| WO | WO 2004/112290 | 12/2004 |
| WO | WO 2005/002201 | 1/2005 |

OTHER PUBLICATIONS

J. Davis "Mosaics of scenes with moving objects", Proceedings of IEEE Computer Society Conference on Computer Vision and Pattern Recognition, Jun. 23-25, 1998, pp. 354-360.

* cited by examiner

TEMPERATURE COMPENSATION IN MULTI-CAMERA PHOTOGRAPHIC DEVICES

CROSS-REFERENCE(S) TO RELATED APPLICATION(S)

This application is a continuation-in-part of U.S. patent application Ser. No. 10/177,315, now U.S. Pat. No. 7,259,784, entitled "A System and Method for Camera Color Calibration and Image Stitching", filed Jun. 21, 2002 by the present inventor and assigned to Microsoft Corp., the assignee of the present application. Priority is claimed to said application which is hereby incorporated by reference for all that is shown and taught therein.

This application is also a continuation-in-part of U.S. patent application Ser. No. 10/608,363, now U.S. Pat. No. 7,298,392, entitled "Omni-Direction Camera Design For Video Conferencing", filed Jun. 26, 2003 by the present inventor and assigned to Microsoft Corp., the assignee of the present application. Priority is claimed to said application which is hereby incorporated by reference for all that is shown and taught therein.

TECHNICAL FIELD

The following description relates generally to image processing. More particularly, the following description relates to calibration of multi-camera photographic devices to compensate for temperature differences.

BACKGROUND

In multi-camera photographic devices—i.e., panoramic cameras—images from two or more individual cameras are combined to produce a single panoramic image. A multi-camera photographic device may use a remapping function from each individual image to the panoramic image to properly size and place each individual image in the panoramic image to make the panoramic image appear seamless.

The remapping function relies on a particular focal length of the camera lenses. A problem with this reliance is that the focal length of a lens changes with a change in temperature. The remapping function is calibrated to a particular room temperature at some point in the manufacturing process of the panoramic camera. If the camera is operated in an environment wherein the temperature is different from the calibrated room temperature, errors can occur in the sizing of the individual images with regard to each other in the panoramic image, thus leading to noticeable seams in the panoramic image.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In panoramic images that are formed from multiple individual images, it is important that each individual image is of a proper size so that when the individual images are assembled, there are no noticeable seams that appear where the images are joined. One factor that can affect the size of an individual image is the focal length of a camera.

An image produced by a camera shrinks as the focal length of the camera increases. In a multi-camera device, such as a panoramic camera, the panoramic image is formed by remapping individual images into a panoramic space. As long as the individual images are an appropriate size relative to each other and to the panoramic space, seams do not appear in the panoramic image.

Such panoramic cameras are calibrated at a particular room temperature to determine a proper remapping function for the particular focal lengths of the cameras. When the cameras are used in a significantly different temperature, however, the focal lengths of the cameras change, thus causing the individual images to shrink or to expand. If the temperature is higher, the focal length will be longer due to expansion of the lens thereby shrinking the resultant image. Conversely, if the temperature is lower, the focal lengths are shorter and the images are expanded. In either case, the individual images will no longer fit properly in the panoramic space and seams between the individual images will appear in the panoramic image.

The expected operating environments of a panoramic camera and the lens material are factors to determine when corrections for temperature are needed. A plastic lens typically has an operating range of ±2° C. while a glass lens typically has an operating range of ±10° C.

If a panoramic camera utilizing glass lenses is used in an environment wherein the temperature does not vary by more than, for instance, 5° C., then temperature correction may not be required. If, however, a panoramic camera having plastic lenses is used in an environment with temperature changes of, for example, 5° C., then correction for temperature may be advantageous.

In one or more of the implementations described herein, ambient temperature is detected by a panoramic camera and adjustments are made to a remapping function so that the individual images are mapped properly to the panoramic space. Appearance of undesirable seams in the resulting panoramic image are thereby avoided.

The adjustments to the remapping function are accomplished by interpolation and/or extrapolation. Typically, the remapping function utilizes a remapping table to convert an image from image space to panoramic space. The remapping table contains values that are calibrated at a particular room temperature.

In at least one implementation described herein, a panoramic camera records an ambient temperature and adjusts the remapping table to correspond to the ambient temperature. If the remapping function utilizes only one remapping table, then the values in the table are extrapolated to determine new values that are used in the remapping function. This can be done linearly by increasing or decreasing the original remapping table values by a ratio of the ambient temperature to the temperature at which the remapping table was calibrated. More general correction functions (e.g., an $n^{th}$ order polynomial) can be used to give improved results over linear correction.

In at least one other implementation described herein, a panoramic camera includes multiple remapping tables, each remapping table being calibrated at a different ambient temperature. During operation, an ambient temperature is recorded. If there is a remapping table corresponding to the ambient temperature, then that particular remapping table is used in the remapping function.

If no remapping table corresponds directly to the ambient temperature, then the two nearest corresponding tables are used and a value is interpolated to determine an appropriate remapping value for the remapping function. Any one of a number of interpolation methods (described in greater detail below) may be used.

Remapping tables can be calibrated at particular temperature intervals. In one implementation, remapping tables are calibrated at 1° C. intervals for each temperature in an expected range of operating temperatures. If a camera has an operating range of ±5° C., then eleven remapping tables may be calibrated. This eliminates the need for interpolation or extrapolation.

Continuing discussion will be made with reference to the figures described above.

Exemplary Operating Environment

Figure 1:
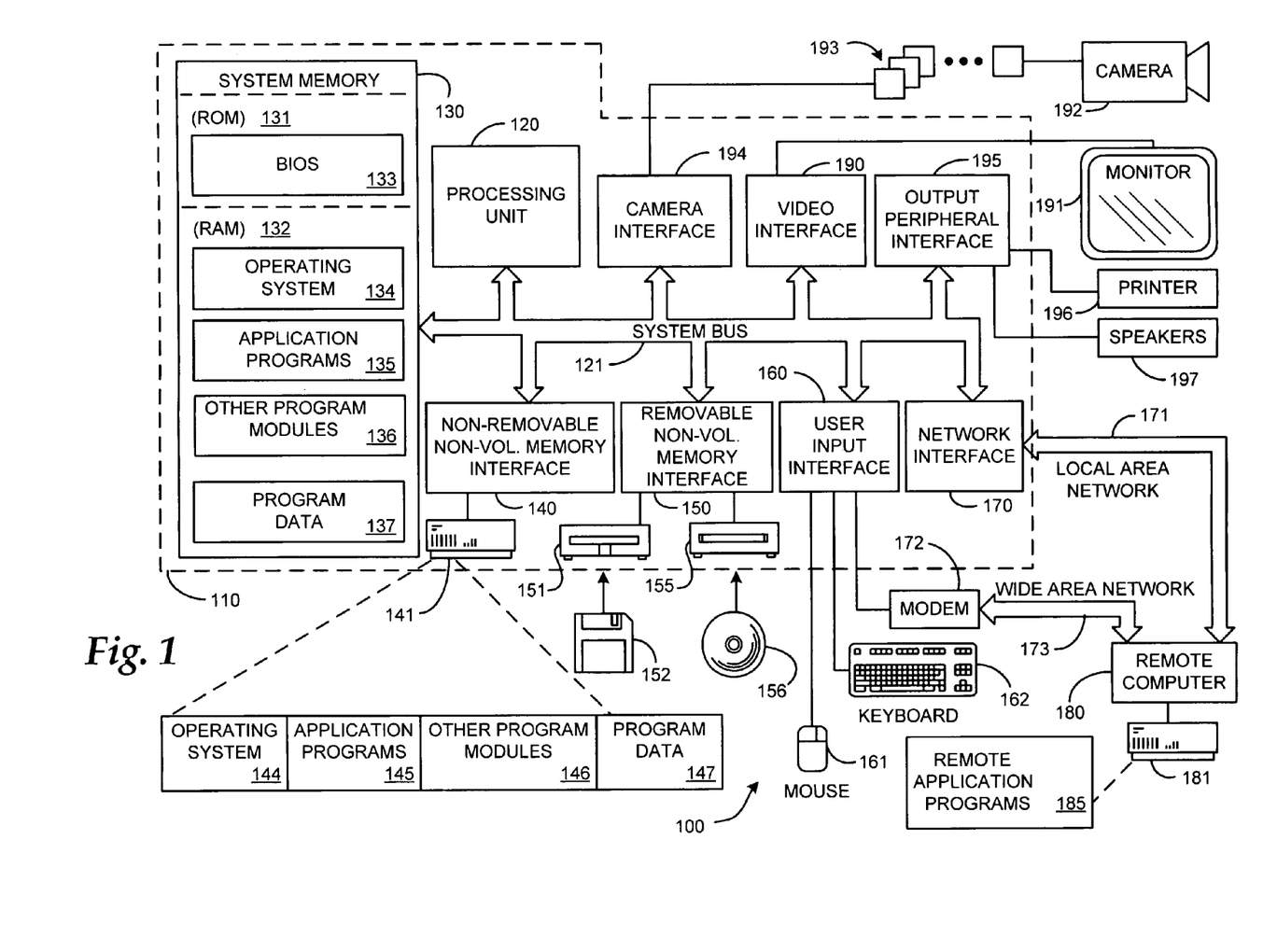
FIG. 1 is a block diagram depicting an exemplary general purpose computing/camera device.

FIG. 1 is a block diagram depicting a general purpose computing/camera device. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

The described techniques and objects are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The following description may be couched in the general context of computer-executable instructions, such as program modules, being executed by a computer. Generally, program modules include routines, programs, objects, components, data structures, etc. that perform particular tasks or implement particular abstract data types. The described implementations may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Photographic Device

Figure 2:
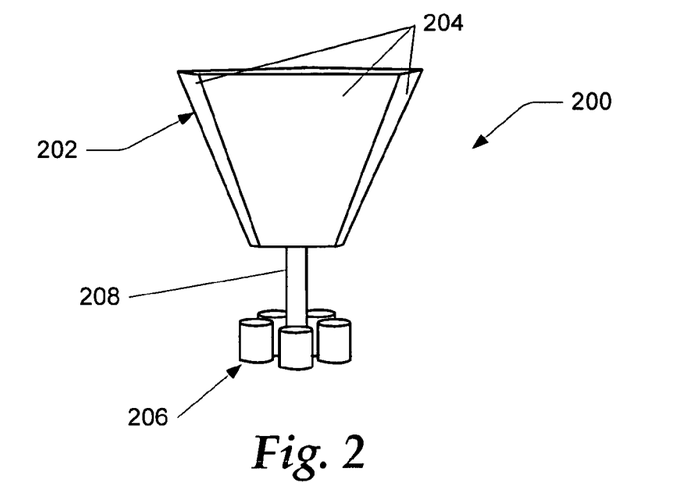
FIG. 2 is a diagram of an exemplary panoramic photographic device that utilized an inverted pyramidal mirror and multiple cameras.

FIG. 2 is a diagram of an exemplary panoramic photographic device 200 that utilizes an inverted pyramidal mirror 202 and multiple cameras 204. The inverted pyramidal mirror 202 includes multiple mirror facets 206, there being one mirror facet 204 for each of the multiple cameras 206. The inverted pyramidal mirror 202 is positioned over the multiple cameras 206 by a column 208.

Although the primary effect of temperature on the panoramic photographic device 200 described herein is related to changes to one or more camera lenses, it is also noted that temperature change may affect other factors, such as the size of the column 208. At different temperatures, the column 208—which may be made of plastic, metal, or some other substance—may expand or contract, thus causing a difference in a length between the inverted pyramidal mirror 202 and the cameras 204. This, too, may affect the size of individual images. This factor may not have as pronounced of an effect as a change to a lens, but it is a factor that can also be compensated for by the techniques and configurations described herein.

Exemplary Camera Configuration

Figure 3:
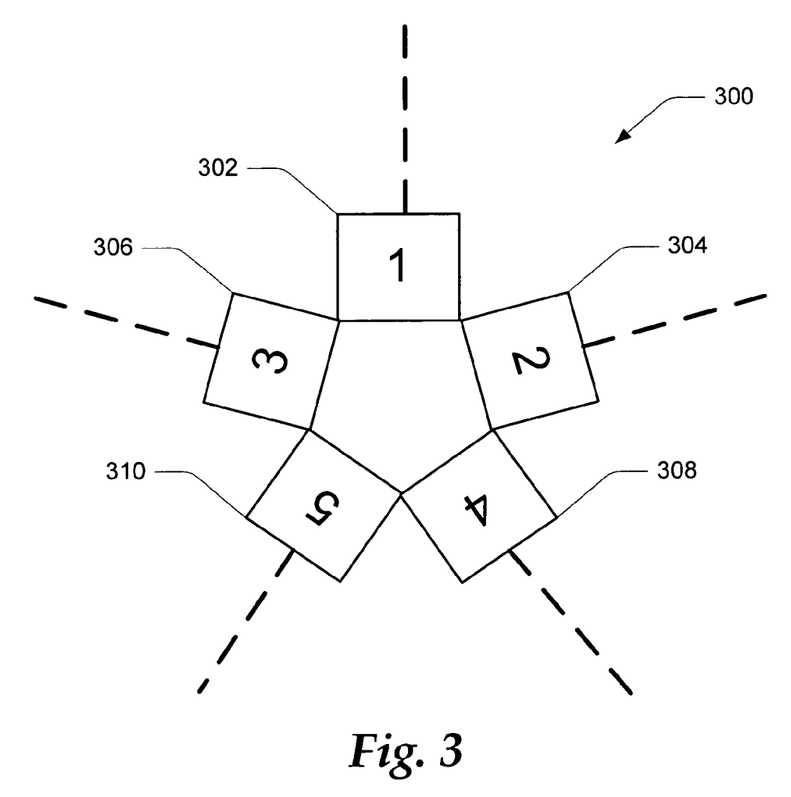
FIG. 3 is a diagram of an exemplary panoramic camera configuration.

FIG. 3 is a diagram of an exemplary panoramic camera 300 in a 360° camera configuration. The diagram is a rough representation of the panoramic photographic device 200 shown in FIG. 2. It is noted that although an example of a multi-camera 360° panoramic photographic device is shown and discussed herein, the present description applies to any multi-camera photographic device in which it is desirable to calibrate the device according to temperature to fix an image in a defined image space. In the following discussion, continuing reference is made to elements and reference numerals shown and described in FIG. 2.

The diagram shows multiple cameras 302-310 arranged in a pentagonal configuration to form the panoramic camera 300, corresponding with the pentagonal shape of the inverted pyramidal mirror 202 of FIG. 2. Each camera 302-310 photographs a different area of the environment of the panoramic camera 300.

For purposes of the following discussion, images taken by the cameras 302-310 are identified as image "1" 10, image "2" 20, image "3" 30, image "4" 40 and image "5" 50. These individual images are assembled to form a single panoramic image.

Exemplary Image Assembly Module

Figure 4:
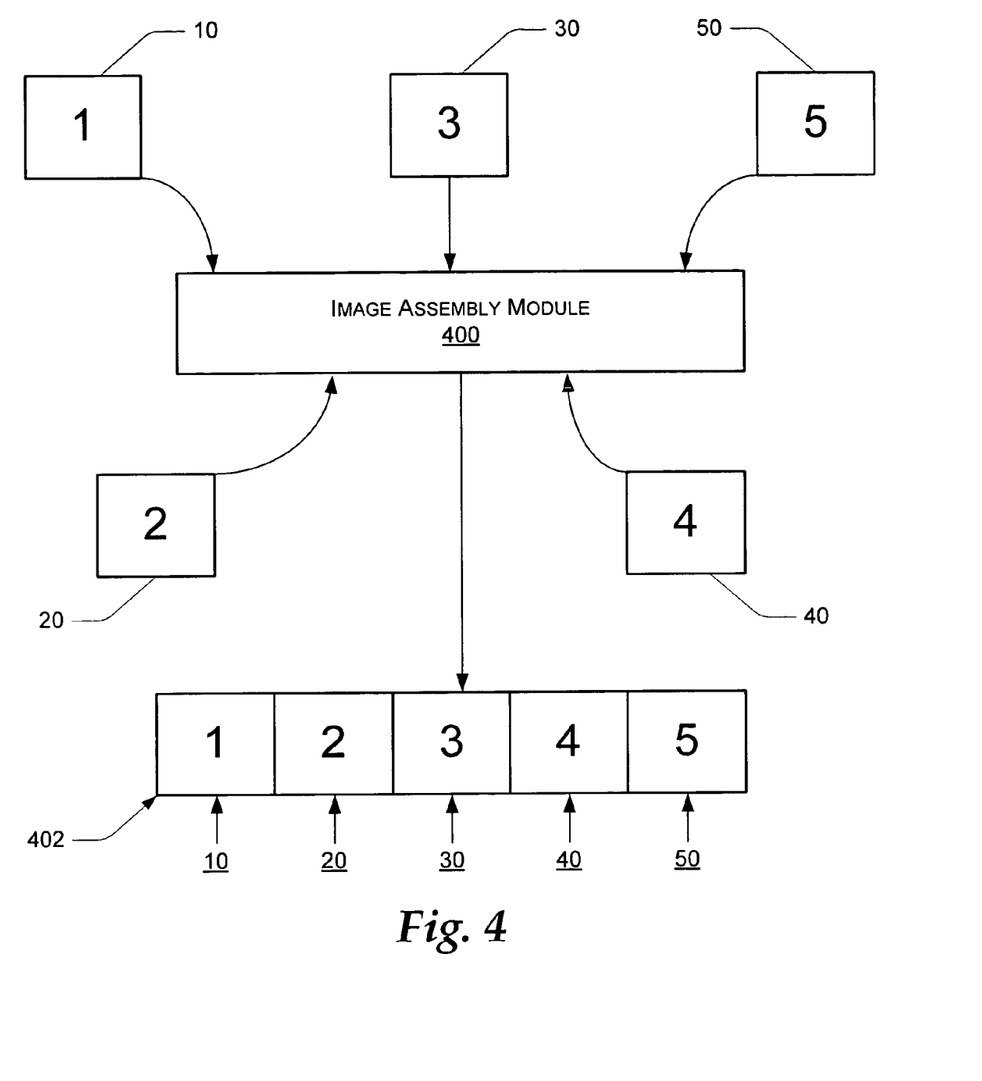
FIG. 4 is a diagram of an exemplary image assembly module that assembles individual images to form a panoramic image.

FIG. 4 is a diagram of an exemplary image assembly module 400 that assembles individual images 10-50 to form a panoramic image 402. The image assembly module 400 receives as input one image from each camera in the panoramic camera.

Utilizing a remapping function that maps pixels in individual image space to pixels in a panoramic image space, the image assembly module forms the panoramic image 402. The remapping function is calibrated so that the individual images are stitched together seamlessly where the images are joined together. This is so that the panoramic image 402 appears seamless, i.e. no distracting artifacts occur between individual images. Typically not all parts of images 10-50 are used by the image remapping function; because of image distortions, some regions of the images are discarded and not used in the panorama.

If an individual image shrinks from or expands to a size different than that for which it is calibrated, seams will appear where the images are joined. If one image shrinks when an adjoining image does not, the images will not match up correctly. If adjoining images shrink, there will not be a continuance of images at a seam between the images. If adjoining images expand, then the images will overlap and cause undesirable effects.

The implementations described herein are used to overcome such undesirable artifacts as may occur due to the resizing of the individual images.

Exemplary Camera

Figure 5:
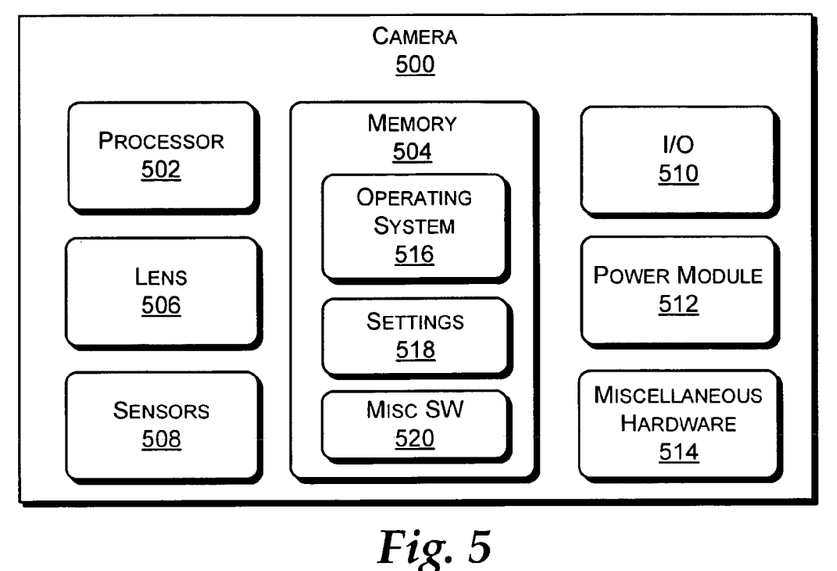
FIG. 5 is a block diagram depicting an exemplary camera.

FIG. 5 is an exemplary camera 500 in accordance with the implementations described herein. In the following discussion, continuing reference is made to elements and reference numerals shown and described in previous figures.

The exemplary camera 500 includes a processor 502, memory 504 and at least one lens 506. The camera 500 also includes several sensors typically found in cameras (e.g. charged coupled device (CCD), Complementary Metal-Oxide Semiconductor (CMOS), etc.) for sensing light and transmitting electronic information.

An input/output (I/O) module 510 is included that consists of one or more units configured to receive external data and/or to transmit data. One example of a common I/O module is a Universal Serial Bus (USB) or other type of port, although the I/O module 510 is not limited thereto.

A power module 512 supplies electrical power to the exemplary camera 500 and the camera 500 includes other miscellaneous hardware 514 elements that may be required to carry out typical functionality of such a camera.

An operating system 516 is stored in the memory 504 and includes executable code that is executed on the processor 502 to control camera operations. The memory 504 also stores camera settings 518 such as channel gains, white balance, exposure settings, and the like, as well as miscellaneous other software elements 520 that may be required to support one or more functions set forth herein or other functions typically performed by digital cameras.

Exemplary Panoramic Photographic Device

Figure 6:
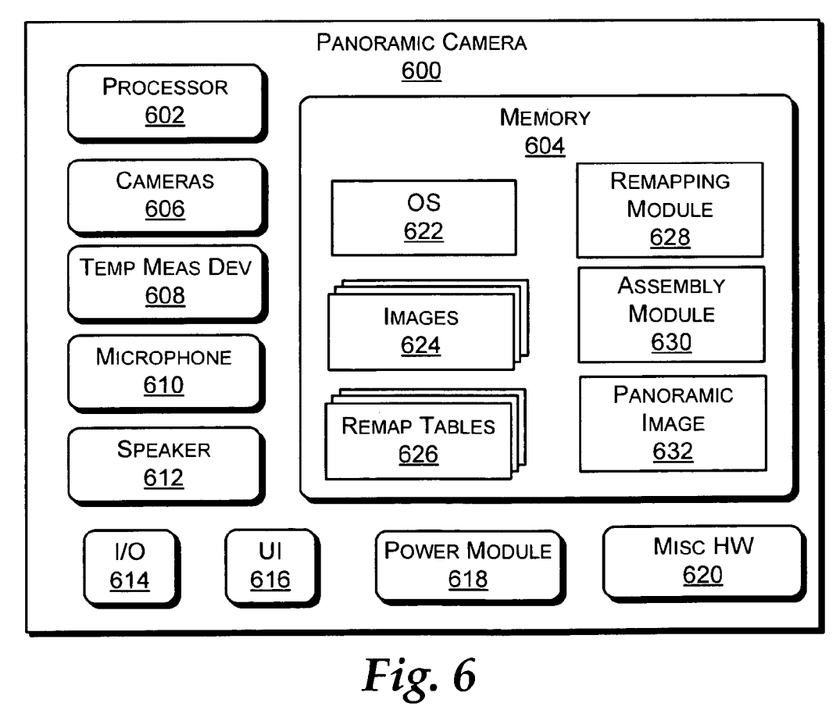
FIG. 6 is a block diagram depicting an exemplary panoramic photographic device.

FIG. 6 is a block diagram of an exemplary panoramic photographic device ("panoramic endpoint 600"). In the following discussion, continuing reference is made to elements and reference numerals shown and described in one or more previous figures.

The panoramic endpoint 600 includes a processor 602, memory 604 and multiple cameras 606 that can be similar to the camera 500 depicted in FIG. 5. The panoramic endpoint 600 also includes a temperature measuring device 608 that is capable of detecting and recording an ambient temperature within an environment in which the panoramic endpoint 600 operates. The temperature measuring device 608 is also equipped to transmit data relating the recorded temperature to one or more other devices.

The exemplary panoramic endpoint 600 is shown having one or more microphones 610, one or more speakers 612, an input/output (I/O) module 614 and a user interface 616 that may include user operable controls and displays. A power module 618 provides electrical power to the panoramic endpoint 600 and its components, and other miscellaneous hardware 620 that may be required to perform some of the functionality described herein.

The memory 604 stores an operating system 622 that includes processor-executable instructions for carrying out operational functionality for the panoramic endpoint 600 and its components. Multiple images 624 detected by the cameras 606 are stored in the memory 604.

One or more remapping tables 626 are also stored in the memory 604 and are utilized by a remapping module 628 to determine a correct mapping of individual images 624 from image space into a panoramic space to create a panoramic image 632. The remapping module 628 operation and the remapping tables 626 will be discussed in greater detail below. Details of one or more remapping techniques are described in parent U.S. patent application Ser. No. 10/608,363 entitled "Omni-Direction Camera Design For Video Conferencing", filed Jun. 27, 2003 by the present inventor and assigned to the assignee of the present application. Said application is hereby incorporated by reference for all that is contained and taught therein.

An assembly module 630 is stored in the memory 604 and is configured to assemble the individual images 624 into the panoramic image 630.

A more detailed explanation of the features and functionality of the subject matter corresponding to previously discussed figures is presented below, with respect to FIG. 7.

Exemplary Methodological Implementation

Figure 7:
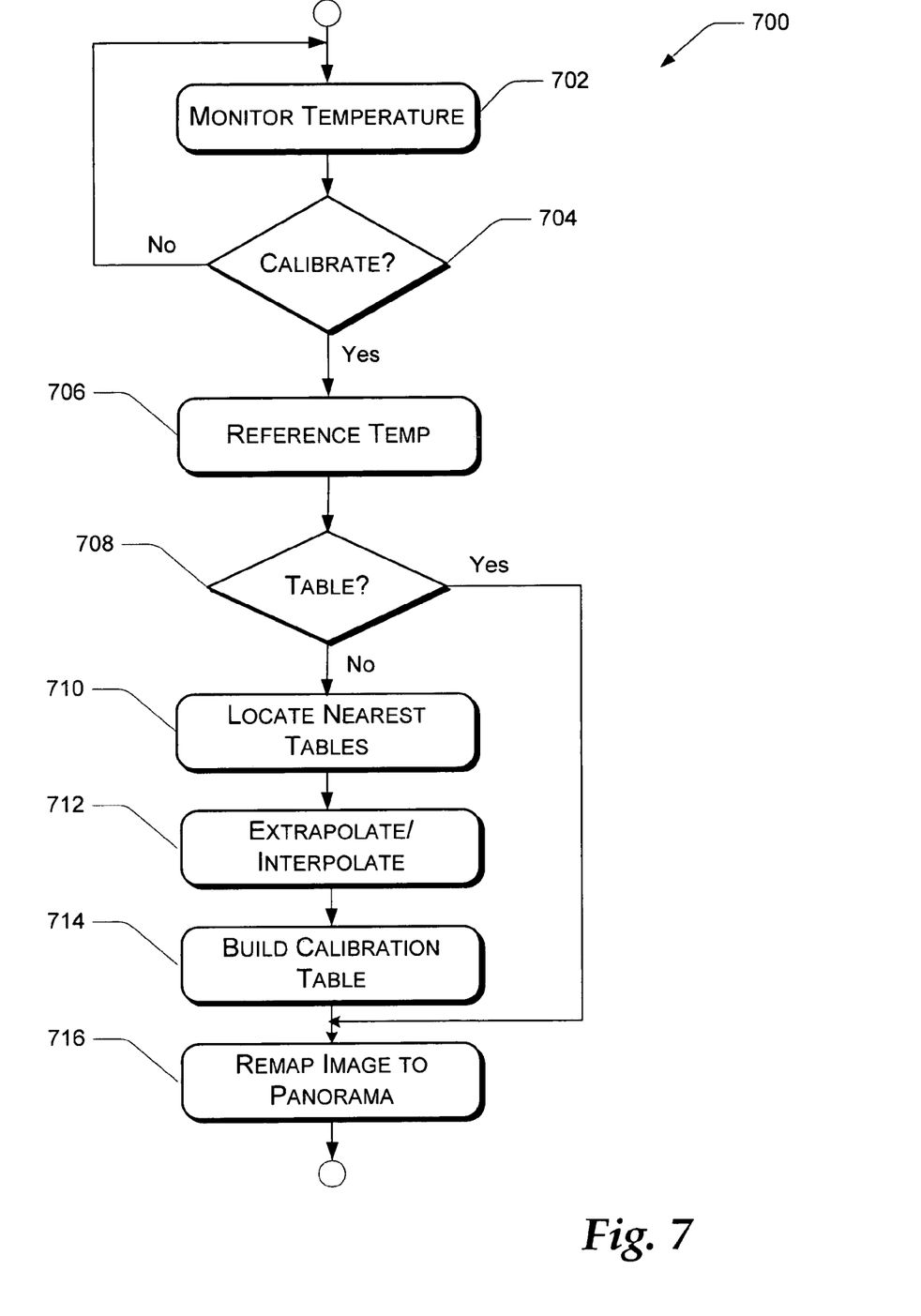
FIG. 7 is a flow diagram of an exemplary process for calibrating a remapping function in a panoramic camera according to ambient temperature.

FIG. 7 is a flow diagram 700 that depicts an exemplary methodological implementation of a process for calibrating a remapping function in a panoramic camera according to ambient temperature. In the following discussion, continuing reference is made to the elements and reference numerals shown and described in the previous figures.

At block 702, the temperature measuring device 608 monitors ambient temperature in a camera environment. The monitoring continues until it is time to perform a calibration routing ("No" branch, block 704). At a predetermined time, a calibration routing is executed ("Yes" branch, block 704).

The time at which the calibration routine is performed may be determined in advance. In one implementation, a calibration is performed when the panoramic camera 600 is powered on. In another implementation, the calibration routine may be run whenever a call is made to the panoramic camera 600 from an external device. In yet another implementation, the calibration routine may be performed at certain periodic intervals, for example, every hour or two. Usually, the calibration routine would not be executed in short intervals because ambient temperature would not be expected to change very often or at a significant rate.

When it is time to run the calibration routine, the ambient temperature is referenced from the temperature measuring device 608 (block 706). If there is a remapping table 626 that corresponds to the referenced temperature ("Yes" branch, block 708), then that particular remapping table 626 is used by the remapping module 628 to remap pixels from image space to panoramic space.

Usually, there will not be an exact match between a remapping table 626 and the ambient temperature unless a number of remapping tables 626 closely approximates the operating range of the panoramic camera 600. If, for example, the panoramic camera operates in an environment ranging from 22° C. to 30° C. and there are nine (9) remapping tables, each corresponding to a temperature between 22° C. and 30° C., there will usually be a match and values from a remapping table may be used without further calculations. Also, for efficiency purposes, temperatures may be recorded in or truncated to integer readings to increase the chances that there will be a remapping table that corresponds to the recorded temperature.

If, however, there is not a remapping table 626 that directly corresponds to the referenced temperature ("No" branch, block 708), then a determination is made at block 710 as to which table or tables most directly relate to the referenced temperature. If the referenced temperature falls outside the range of remapping tables 626—i.e., the referenced temperature is lower than the remapping table corresponding to the lowest temperature or is higher than the remapping table corresponding to the highest temperature—then the remapping module 628 extrapolates remapping values from the nearest corresponding remapping table 626 at block 712. This may be accomplished using only the nearest remapping table 626 or using the nearest remapping table 626 and one or more other remapping tables nearest to it in calibrated temperature. Any extrapolation method known in the art may be used for this purpose.

If the referenced temperature falls between two remapping tables 626 (i.e. between two temperatures for which remapping tables exist), then the two remapping tables are used to interpolate values for the referenced temperature. For example, if the referenced ambient temperature is 25° C. but no remapping table 626 exists that contains calibration values for that temperature, it is determined if there is a remapping table 626 for a temperature below 25° C. and if there is a remapping table 626 for a temperature above 25° C. If so, the tables nearest 25° C. are used and corresponding values of the tables are used to interpolate new values for a remapping table corresponding to 25° C.

In the above example, consider a situation in which there is a remapping table 626 calibrated at 22° C. and a remapping table 626 calibrated at 28° C. Then corresponding values in each table are used to construct (virtually or literally) a remapping table for 25° C. (block 714). If a new remapping table 626 is literally constructed, the interpolation technique will be carried out for each value in the existing remapping tables 626 and stored for the new remapping table 626. If a new remapping table 626 is not literally constructed, then the remapping module 626 calculates an interpolated value from two or more remapping tables 626 and passes the value to the assembly module 628 after it is derived. The assembly module 628 carries out the remapping process to build the panoramic image 630.

One way in which this interpolation can be done is by taking a weighted average of corresponding values in the two tables. Since the referenced temperature in this example falls exactly between two remapping tables, an average between corresponding table values will suffice to create a remapping—or calibration table—that corrects the remapping function for the referenced temperature (25° C.).

Any interpolation method known in the art for deriving remapping values corresponding to the referenced temperature may be used, such as linear interpolation, quadratic interpolation, bi-quadratic interpolation, bi-cubic interpolation and the like. It is noted that for some interpolation techniques, more than two remapping tables 626 may be needed. Those skilled in the art will recognize the techniques available for deriving the correct remapping values from the referenced temperature and the remapping tables 626.

One technique which can be used to correct an image when a lens changes from a first focal length ("f1") to a second focal length ("f2") is image scaling by a factor of f2/f1. For example, if f1 increased to f2, that represents a zoom by f1/f2 and the image needs to be corrected by f2/f1.

One way in which that can be done in the context of the present description is to apply the scaling factor to the individual images before the images are assembled into a panoramic image. Another way to accomplish the scaling is to combine the scaling with the remapping procedure. For example, if $T(x,y)=(u,v,C)$ maps camera C pixel (u,v) onto panorama point (x,y), then the corrected function is $T(x,y)=(f2/f1*u, f2/f1*v, C)$.

It is noted that the actual focal length of a lens does not have to be known, only a nominal focal length, a current temperature (t), and calibrated temperature (t0). Let S(t, t0) be the image scaling factor. This function can be determined using lens design programs known in the art. It is sufficient to implement S(t, t0) as a lookup table with integer values t and t0.

A direct method to create the image remapping tables 626 at different temperatures is to calibrate the camera at each of those desired temperatures. To reduce manufacturing time, a model can then be generated to fit these measurements so that only one calibration is needed; the image remapping functions for other temperatures are then generated using this model.

At block 716, the assembly module 630 uses the calibration values derived (either directly, by extrapolation or by interpolation) from the remapping tables 626 to map the individual images 624—pixel by pixel—from image space to panoramic image space to form the panoramic image 632.

CONCLUSION

While one or more exemplary implementations have been illustrated and described, it will be appreciated that various changes can be made therein without departing from the spirit and scope of the claims appended hereto.

The invention claimed is:

1. A method, comprising:
   determining an ambient temperature corresponding to a camera environment;
   determining one or more remapping tables corresponding to the ambient temperature; and
   using remapping table values contained in the one or more remapping tables in a remapping function that remaps multiple images to form a panoramic image,
   wherein each of the multiple images is taken from a different one of multiple distinct cameras positioned to have a small non-zero distance between their virtual centers of projection so as to reduce parallax error at a predefined distance from the multiple distinct cameras.

2. The method as recited in claim 1, wherein the step of using remapping table values further comprises using exact values contained in a single remapping table for the remapping function if the single remapping table corresponds exactly to the ambient temperature.

3. The method as recited in claim 1, wherein the step of using remapping table values further comprises extrapolating remapping values for use in the remapping function from a remapping table that most closely corresponds to the ambient temperature.

4. The method as recited in claim 1, wherein the step of using remapping table values further comprises deriving remapping values for use in the remapping function from at least two remapping tables that most closely correspond to the ambient temperature.

5. The method as recited in claim 4, wherein at least one remapping table corresponds to a temperature lower than the ambient temperature and at least one other remapping table corresponds to a temperature higher than the ambient temperature.

6. The method as recited in claim 1, wherein the camera environment is a panoramic camera that comprises two or more component cameras.

7. A system, comprising:
- multiple cameras each having a lens with a focal length and aligned to have a small non-zero distance between virtual centers of projection relative to each other so as to reduce parallax error at a predefined distance from the cameras;
- a temperature measuring device configured to measure an ambient temperature;
- memory for storing an individual image from each of the multiple cameras;
- at least two remapping tables, each remapping table corresponding to a calibration temperature; and
- a remapping module configured to remap pixels from the individual images to a panoramic image according to one or more remapping tables according to the measured ambient temperature.

8. The system as recited in claim 7, wherein the remapping module is further configured to use a remapping table that corresponds to the measured ambient temperature.

9. The system as recited in claim 7, wherein the remapping module is further configured to remap pixels using values extrapolated from a remapping table that corresponds to a calibration temperature that is closer the measured ambient temperature than calibration temperatures corresponding to other remapping tables.

10. The system as recited in claim 7, wherein the remapping module is further configured to remap pixels using values interpolated from two or more remapping tables.

11. The system as recited in claim 7, wherein the remapping module is further configured to remap pixels using values interpolated from a first remapping table that corresponds to a calibration temperature that is nearest to but not greater than the measured ambient temperature and a second remapping table that corresponds to a calibration temperature that is nearest to but not less than the measured ambient temperature.

12. One or more computer storage media containing executable instructions that, when executed, perform the following steps:
- receiving an ambient temperature;
- receiving multiple individual images, each individual image being taken by an individual camera, the individual cameras positioned to have a small non-zero distance between their virtual centers of projection so as to reduce parallax error at a predefined distance from the cameras;
- determining one or more appropriate remapping tables according to the ambient temperature;
- remapping the individual images onto panoramic space according to the remapping table so that a panoramic image can be created from the panoramic space.

13. The one or more computer storage media as recited in claim 12, wherein the determining step further comprises determining a remapping table that corresponds directly to the ambient temperature.

14. The one or more computer storage media as recited in claim 12, wherein the determining step further comprises:
- determining a remapping table that most nearly corresponds to the ambient temperature; and
- extrapolating appropriate remapping values from the remapping table.

15. The one or more computer storage media as recited in claim 12, wherein the determining step further comprises:
- identifying a first remapping table corresponding to a first calibration temperature that is nearest to but not greater than calibration temperatures corresponding to other remapping tables;
- identifying a second remapping table corresponding to a second calibration temperature that is nearest to but not less than calibration temperatures corresponding to other remapping tables; and
- deriving appropriate remapping values by interpolating between corresponding values from the first remapping table and the second remapping table.

16. The one or more computer storage media as recited in claim 12, wherein the at least one remapping table further comprises at least two remapping tables, each remapping table corresponding to a different calibration temperature.

17. The one or more computer storage media as recited in claim 12, further comprising the multiple individual images.

* * * * *